United States Patent
Begueria

(12) 
(10) Patent No.: US 6,455,092 B1
(45) Date of Patent: Sep. 24, 2002

(54) METHOD FOR MAKING CHEESE PRODUCTS

(75) Inventor: Corinne Begueria, Vendome (FR)

(73) Assignee: Fromageries Bel, Paris (FR)

( * ) Notice: Subject to any disclaimer, the term of this patent is extended or adjusted under 35 U.S.C. 154(b) by 0 days.

(21) Appl. No.: 09/424,664

(22) PCT Filed: May 26, 1998

(86) PCT No.: PCT/FR98/01049

§ 371 (c)(1), (2), (4) Date: Jan. 6, 2000

(87) PCT Pub. No.: WO98/53697

PCT Pub. Date: Dec. 3, 1998

(30) Foreign Application Priority Data

May 27, 1997 (EP) .............................. 97401164

(51) Int. Cl.⁷ .......................... A23C 19/09; A23C 19/08
(52) U.S. Cl. ............................ 426/582; 426/36; 426/39
(58) Field of Search ............................. 426/34, 36, 39, 426/334, 74, 582

(56) References Cited

U.S. PATENT DOCUMENTS

| | | | |
|---|---|---|---|
| 1,522,383 A | | 1/1925 | Parsons et al. ............. 426/582 |
| 2,009,238 A | | 7/1935 | Parsons ..................... 426/582 |
| 4,104,413 A | * | 8/1978 | Wynn et al. ................. 426/582 |
| 4,960,605 A | * | 10/1990 | Trecker et al. .............. 426/582 |
| 5,104,675 A | | 4/1992 | Callahan et al. ............ 426/582 |
| 5,200,216 A | * | 4/1993 | Barz et al. ................... 426/36 |
| 5,215,778 A | * | 6/1993 | Davison et al. ............. 426/582 |
| 5,244,687 A | | 9/1993 | Rybinski et al. ............ 426/582 |
| 5,277,926 A | * | 1/1994 | Batz et al. ................... 426/582 |
| 5,505,979 A | * | 4/1996 | Sevenich .................... 426/582 |
| 5,567,464 A | * | 10/1996 | Barz et al. .................. 426/582 |
| 5,614,244 A | | 3/1997 | Heick et al. ................ 426/582 |
| 5,676,984 A | * | 10/1997 | Bohanan et al. ............. 426/34 |
| 5,902,625 A | * | 5/1999 | Barz et al. .................. 426/582 |

FOREIGN PATENT DOCUMENTS

| | | |
|---|---|---|
| DE | 489 408 | 1/1925 |
| EP | 0 535 728 | 4/1993 |
| FR | 2 383 610 | 10/1978 |
| GB | 536 921 | 5/1941 |
| GB | 2 066 837 | 7/1981 |
| WO | 95/19699 | 7/1995 |

* cited by examiner

Primary Examiner—Milton I. Cano
Assistant Examiner—Robert Madsen
(74) Attorney, Agent, or Firm—Young & Thompson

(57) ABSTRACT

A method for making a cheese product by processing an initial substance consisting of a cheese, includes the following steps: a) thermal and mechanical treatment such as stirring the initial cheese fractionated into pieces, at a temperature less than 60° C., to break down the initial cheese protein structure in a limited way; b) cooling the mixture of step a) to a temperature less than 50° C. to start building up the protein structure and to constitute a stable emulsion of fats with the initial cheese other constituents; c) if required, mechanically treating the paste obtained at b) in a worm device to complete the building up of the protein structure and stabilize the emulsion; and d) shaping the paste resulting from step c). Steps a) and b) are carried out by adding to the initial cheese product a mixture comprising an emulsifying and chelating agent of calcium and sorbic acid or a salt thereof.

15 Claims, No Drawings

METHOD FOR MAKING CHEESE PRODUCTS

CROSS REFERENCE TO RELATED APPLICATION

This application is a 371 of PCT/FR98/01049 filed on May 26, 1998, which designated the United States of America.

FIELD OF THE INVENTION

The invention relates to a process for manufacturing novel cheese products by treating a starting material consisting of a cheese and to the products obtained by this process.

BACKGROUND OF THE INVENTION

Cheeses obtained by treating cheese products resulting from the treatment of milk are already known; as the most representative family of this category of products mention may be made of the family of processed cheeses; these are obtained by grinding any category of cheese resulting from milk, more specifically pressed cheeses, mixing them with other dairy raw materials (whole milk powder, partially or totally skimmed, butter, anhydrous dairy fat, buttermilk, protein concentrates, etc.) in an amount which varies depending on the type of end products which it is desired to obtain, incorporating into the said mixture emulsifying salts selected from the family of the polyphosphates, orthophosphates or citrates of sodium, potassium and calcium, then heat-treating the mixture at temperatures of between 80 and 140° C. for a period ranging from a number of seconds to several minutes, depending on the temperature. For the implementation of this process the emulsifying salts are used for their calcium-complexing properties, which brings about solubilization of the proteins, which makes emulsification easier by a stabilizing effect on the pH.

However, the prime disadvantage of such a process is that it leads to a type of cheese which, despite a nutritional value equivalent to that of the products employed, and a possibility for varied presentations (portions, slices, blocks, etc.) and excellent preservation, greater than that of the initial product, differs totally from the original product both in its texture and in its flavour.

Thus, analysis of the degree of peptization, which expresses a structural change of the proteins in the course of the process and is measured by the proportion of non-sedimentable soluble nitrogen, which is associated with the liberation of the soluble peptides during the manufacturing treatment, indicates a value of between 40 and 50 for cheeses obtained by heat treatment at greater than 100° C. as against values close to 0 for cheeses which have not undergone treatment.

The melting process involved has the further effect of greatly destructuring the raw material employed, which explains the difference in textural and organoleptic properties between the original product and the end product.

In order to obtain end products whose textural and flavour characteristics come closer to the original product, while offering varied presentations and improved preservation, certain authors have proposed processes involving less destructuring. Mention may thus be made of Patent Application WO 95/19699, which describes a process for reconstituting cooked pressed cheeses, downgraded or in lump form, the process described consisting in dividing the raw material into regularly shaped lumps, in subjecting the divided cheese, without adding water or any other ingredient, to controlled operations of blending and shearing, and to cooking at a temperature of between 70 and 80° C., preferably in a cooker/extruder-type apparatus. According to the authors of the invention, the process does not result in any degradation of the proteins during the treatment, and the end product exhibits biochemical, physicochemical and organoleptic characteristics comparable with those of the raw material. However, the authors of the preceding invention have established that, in contradistinction to the indications in the document, the temperatures utilized are not without consequence for the condition of the proteins and the aromatic loss. Furthermore, tests carried out by the applicant employing the said process have shown that the products obtained exhibit fat exudation, resulting in product appearances which are not very attractive for the consumer. This exudation is explained by poor emulsification and, consequently, poor bonding of the fat to the protein network.

Furthermore, the process employed is applied solely to cooked pressed cheese, i.e. products having a high dry-matter content, and for its implementation requires the division of the original cheese into regularly shaped lumps, and also the use of a suitable cooking/extruding apparatus.

Patent EP 0 260 194 proposes solving the difficulties of poor stability of an emulsion of this type by incorporating an emulsifier and describes a process comprising a first step of adding proteins to the cheese and a second step of mechanical shaping treatment, the starting cheese being selected from ripened cheeses containing at least 50% dry matter and, more specifically, from cooked or uncooked pressed cheeses to which are added, in a proportion of from 5 to 10%, proteins selected from proteins having an emulsifying function at a temperature lower than their coagulation temperature, these two raw materials being mixed so as to allow subsequent mechanical shaping treatment of the cheese and the production of a cheese which has a texture, flavour and colour substantially identical to those of the starting cheese and also a specific shape resulting from the mechanical treatment employed.

In this process, the proteins are added to the cheese to be treated when the latter is at a temperature of between 40 and 80° C., preferably 80° C., and the mixture is treated mechanically at a temperature of between 40 and 50° C. The emulsifier utilized is preferably selected from the family of the seroproteins, the latter being selected for their emulsifying properties to the exclusion of all other properties. The process described in Patent EP 0 260 194 therefore makes it possible to obtain a higher-quality emulsion than that of Patent WO 95/19 699 but has the disadvantage of being limited to cheeses having a dry-matter content of greater than 50%. Furthermore, the addition of seroproteins to the cheese to be treated, in a proportion of between 5 and 10% by weight, is not without effect on the presence of off-flavours. Moreover, the spectrum of action of the seroproteins is not sufficient for the realization of a complete emulsion which eliminates any subsequent exudation of fat at the surface of the product. This defect is manifested in the flavour of the resulting products (a product greasy in the mouth and very pasty), which may be acceptable for composite products obtained by extruding the curd and a cheese or other filling, but becomes unacceptable for an essentially cheese-based product.

SUMMARY OF THE INVENTION

The aim of the invention is to provide a novel process for manufacturing cheese products obtained by treating cheeses resulting from the treatment of milk which do not have the defects of the products manufactured in accordance with the described technologies and have organoleptic and textural characteristics which are close to the original products.

The process will at the same time have to limit to the maximum the modifications of the proteins and will have to allow effective re-emulsification of the fat and of the protein network in order to avoid any exudation of fat from the end product, such that, in the end product, the textural and flavour characteristics encountered are as close as possible to the original product.

For this purpose, the subject of the invention is a process for manufacturing a cheese product by treating a starting material consisting of a cheese, comprising the following steps:

a) heat treatment and mechanical treatment, of the kneading type, of the starting cheese, after fractionation into pieces, at a temperature less than 60° C., in order to obtain limited destructuring of the protein network of the starting cheese, b) cooling of the mixture from step a) to a temperature less than 50° C. in order to initiate the restructuring of the protein network and the constitution of a stable emulsion of the fats with the other constituents of the starting cheese;

c) if necessary, mechanical treatment of the curd obtained in b) in an endless-screw apparatus, in order to complete the restructuring of the protein network and to stabilize the emulsion, and d) shaping of the curd obtained in step c), in which steps a) and b) are carried out by adding to the starting cheese product a mixture comprising an emulsifying and calcium-complexing agent and sorbic acid or a salt thereof.

For the purposes of the present invention, salt means a salt for food use, in particular the salts of sodium, calcium and potassium.

Steps a) and b) of destructuring, initiation of restructuring and constitution of a stable emulsion of the protein network and of the fats are advantageously effected by the combined employment of mechanical treatment of the kneading (or mixing) type and moderate heat treatments of the starting cheese substance in the presence of the novel structuring agent defined above consisting of the combination of an emulsifying and calcium-complexing agent (A) and sorbic acid or a salt thereof (B).

The emulsifying and calcium-complexing agent (A) can be any agent of this type which is traditionally used in the dairy industry, such as citric acid or its salts, and the phosphates, in particular the orthophosphates and polyphosphates, of sodium, potassium and calcium.

These agents are widely used in processed cheese manufacturing technology for their destructuring action on the protein network, by complexation of the calcium, and their emulsifying action, but at doses and under heat treatment conditions which ensure large-scale destructuring of the protein network.

In accordance with the invention, only very partial destructuring of the protein network of the cheese to be treated is employed; these agents are therefore not used under the customary activity conditions. Moreover, the realization of a perfect emulsion and of perfect restructuring is obtained by adding a compound which will complete the restructuring role of the citrates and/or phosphates.

Surprisingly, the Applicant has demonstrated the synergistic role of the conventional complexing and emulsifying agents with sorbic acid or its salts on the restructuring of the product and the stability of the emulsion.

Comparative tests employing in isolation either an emulsifying and calcium-complexing agent of the type described above or sorbic acid or a sorbate have revealed, in sensory analyses, defects of texture of the product, which are caused by incomplete reorganization of the network. As well as the fact that the end product obtained by using compounds (A) and (B) of the invention involves no change in the structure of the proteins (the proportion of non-sedimentable soluble nitrogen in the end product being equivalent to that in the starting product), the end product exhibits a cohesion which is quite remarkable and a texture which is similar if not identical to the starting raw material.

Advantageously, the ratio A/B is between 3/1 and 9/1, the amount of A being preferably from 0.15 to 1.8% by weight and that of B from 0.05 to 0.2% by weight, relative to the total weight of the mixture.

The function of the structuring agent composed of A and B is to ensure, firstly, limited destructuring of the protein network by complexing only part of the calcium, and, secondly, restructuring of the protein network at the same time as effective emulsification of the fat, so as to avoid its exudation.

Particularly advantageous combinations of A and B are the combinations of sodium citrate/sorbic acid or sodium polyphosphates/sorbic acid, the latter combinations exhibiting the further advantage of having a bacteriostatic activity, which makes it possible to improve the preservation of the end product.

Although citric acid or phosphates and polyphosphates are known and are used in food technology as acidulants, emulsifiers, metal-complexing agents in jams, jellies, crystallized fruits and various novel foods of intermediate moisture content, such as processed cheeses, the same is not true of sorbic acid or sorbates, which are used essentially for their antimicrobial activity, especially fungistatic activity; they are, furthermore, commonly used for this purpose in fatty emulsions (margarines, cheeses), vinegar products, dried fruits, fruit juices and various other preparations. Sorbic acid is more active at a low pH but its effectiveness may be less influenced by the pH than those of other acidic preservatives with the exception of propionic acid. The antimicrobial action is explained by an inhibition which is exerted on enzymes containing sulphydryl groups, especially dehydrogenases.

The present invention therefore describes for the first time the use of sorbic acid or its salts to reinforce the emulsifying and structuring role of an agent used conventionally for this purpose in the food industry, especially the cheese industry, on account of the service pH conditions.

For the realization of the invention, it is possible to start from cheeses of any category which are obtained from milk in accordance with the technologies traditionally employed. The cheeses are obtained by the following successive steps:

(1) setting or coagulation of the standardized milk or of a milk concentrate, by the action of a coagulant, (2) shaping of the drained or undrained curd in moulds, (3) spontaneous draining or draining under pressure, enabling the desired dry-matter content to be obtained in the end product, (4) salting or brine treatment, which gives the curd the desired salt content and allows the formation of a surface rind, and (5) drying off.

For cheeses with a natural rind, these steps are followed by a step of (6) inoculation of the surface of the cheese with a surface flora which is appropriate to the types of cheese which it is desired to obtain, and which is left to develop for a longer or shorter ripening period in the course of which measures are taken which promote the growth of the flora.

All types of cheese obtained by the process described above are suitable for the realization of the invention; however, those possessing a dry-matter content of greater than 40% by weight are preferred.

Prior to the destructuring/restructuring of the starting cheese, it is preferably divided or cut into pieces or strands or ground to a meal.

Advantageously, the pieces have a volume which is less than or equal to 125 cm$^3$. In addition, the starting cheese can be cut into cubes whose edge length is less than or equal to 5 cm, for example with the aid of a customary commercial cutter.

When the starting cheese is grated, any known industrial grater is used for this purpose.

The structuring agent according to the invention is added to the cheese, preferably after the said gent has been dissolved in water. The structuring agent is preferably employed in an amount which does not exceed 2% of the total weight of the cheese.

For the purposes of the invention it is also possible to add water to the cheese in order to obtain a final dry-matter content lower than the dry-matter content of the starting cheese. In all cases, the proportion of water is limited to 30% by weight of the starting cheese, but is preferably less than 10% by weight, in particular in the case where it is desired to obtain an end product having textural and organoleptic characteristics close to the original product.

Step a) is advantageously carried out by subsequently subjecting the starting cheese in the form of pieces, strands or meal, after having added the above-defined structuring agent and, if appropriate, after having added water, to a gentle heat treatment, which consists in heating the starting product to a temperature of between 30 and 60° C. for a period of between 30 seconds and 2 minutes while mixing the curd in order to produce a homogeneous mixture.

The treatments of step a) are carried out in any appropriate apparatus. Mention may be made of steam injection systems; such as the cutters employed in pork butchery or in processed cheese technology and the kneaders used in the bakery trade.

The mixing speed is advantageously between 100 and 600 rpm, preferably 100 and 300 rpm, for apparatuses used conventionally in the cheese industry. Thus the mixing speed is preferably between 100 and 150 rpm for the screw of a kneader-type apparatus and 250 and 300 rpm for the blade of a cutter-type apparatus.

Step b) is advantageously conducted by cooling the resulting curd at a temperature of between 25–50° C. for a period of from 1 to 3 minutes. The cooling temperature is dependent on the heating temperature but is not greater than 50° C.

The mechanical treatment of step b) is of the same type as that of step a), although the conditions may vary within the range specified above; steps a) and b) advantageously take place in the same apparatus.

Advantageously, steps a) and b) are conducted under partial vacuum so as to avoid aromatic losses and reduce the oxidation of the product; the vacuum is advantageously between 0.4 and 0.7 bar.

At the end of step b), the curd obtained can be transferred to an endless-screw device in which it undergoes a simple mechanical treatment intended to complete the restructuring of the protein network and to stabilize the emulsion. The residence time in the endless-screw device is advantageously between 30 seconds and 5 minutes. By simple mechanical treatment is meant an advancing treatment without any additional effect, such as a heat or pressure effect, as is the case for extrusion. Positioned at the outlet end of the endless screw is a shaping die.

The products emerging from this device are in variable shapes (beads, cylindrical shapes, ovoid shapes, etc.) depending on the profile of the shaping die which is situated at the outlet end of the endless screw; they are subsequently cooled and packaged.

The products emerging from the endless-screw device can also, at the outlet of the shaping die, be placed in moulds in order to impart the desired definitive shape to the end product. Advantageously, the product placed in the mould can be subjected to a slight pressing operation in order to improve shaping.

The end product is then packed into any appropriate packaging, covered with cheesemaking waxes or substitutes thereof, such as acetoglycerides or edible coverings; it can also be advanced, at the outlet of the extruder, into plastic shells by means of passage into a two-part moulder.

The products obtained are of any shape and of any weight; advantageously, the weight is between 5 and 500 g.

In a first embodiment of the invention, the process described above is conducted without adding products other than the calcium-complexing agent, the sorbic acid or a salt thereof and, optionally, water, in an amount less than 10% by weight, and without an additional treatment step, and the products obtained have a texture and organoleptic qualities close to the original product. This indicates the very advantageous nature of such a process for the manufacture of small-format cheeses having flavours similar to very large-format cheeses such as cooked pressed cheeses, cheddar and similar products, ®Leerdammer, sections obtained from cow's milk, sheep's milk or goat's milk, or soft cheeses.

In a second embodiment of the invention, the structuring agent according to the invention is added to the starting cheese at the same time as feature food elements of vegetable or animal origin in a proportion of from 1 to 10% of the weight of cheese; water is added optionally in a proportion which does not exceed 30%, preferably less than 10% by weight, and the mixture obtained is treated as described above.

In a variant, the feature elements are added after step b).

This alternative is of interest insofar as it makes it possible to present the consumer with a range of products whose organoleptic characteristics combine those of traditional cheeses having a characteristic flavour (the fruity flavour of cooked pressed curds, for example) with that of the feature elements (walnut, hazelnut, pistachio, peanuts, pieces of ham, vegetable extracts, etc.) using a simple and rapid process.

The products obtained in accordance with this embodiment can be of any grammage and any format.

In a third embodiment of the invention, the mixture obtained from the starting cheese, optionally following division into pieces or grating, addition of the structuring agent of the invention and, optionally, addition of water, is subjected at the end of step b) to an expansion treatment by incorporation of nitrogen or any other appropriate and compatible gas, with the aid of a customary expansion apparatus. In this case, the curd does not undergo the mechanical treatment step c).

The curd obtained is subsequently packed after shaping in a mould or is deposited directly in the final packaging. By this means, a whole range of novel products are obtained which combine the flavour characteristics of the starting cheese with an aerated texture.

Whichever alternative is used, the process of the invention readily provides a variety of products of any grammage and any shape which can be packed in any form of packaging (packets, paper, aluminium-coated plastic films, plastic shells) or of covering (cheese-making waxes or substitutes).

The invention additionally provides for the use of sorbic acid or a salt thereof, of food-use grade, for reinforcing the emulsifying and structuring role of an emulsifying and calcium-complexing agent in a food composition, in particular a cheese-based food composition.

The emulsifying and calcium-complexing agent is preferably citric acid, phosphoric acid, polyphosphoric acid or salts thereof.

DETAILED DESCRIPTION OF THE INVENTION

The invention is illustrated by the examples below, which are given by way of illustration and not limitation. The percentages are by weight.

The weights of the various ingredients are indicated as a percentage relative to the total weight of the curd, unless indicated otherwise.

EXAMPLES

Example 1

Manufacture of a Product Based on a Cooked Pressed Curd (Emmenthal)

The cheese is grated (1.6×1.6 mm×100 mm) and introduced cold into a chamber for kneading and heat treatment under vacuum (cutter), and Na citrate (in a proportion of 4.5% by weight) and sorbic acid (in a proportion of 0.065% by weight) are added, followed by 2% by weight of water.

The mixture is then salted: 0.8% (weight/weight) of NaCl. It undergoes:
mixing under partial vacuum, lasting 2 minutes, at a temperature of 5° C., with mechanical stirring,
heat treatment under partial vacuum (0.8 bar), by direct steam injection, lasting for 1 minute, with mechanical stirring, to reach a temperature of 45° C.,
conditioning, under partial vacuum with mechanical stirring, at the temperature which was reached, for 20 seconds,
cooling with reduced mechanical stirring to a temperature of 40° C. under partial vacuum (0.7 bar) for 1 minute.

The vacuum is interrupted and the mass obtained in accordance with the preceding steps is discharged into a twin-screw apparatus in which the restructuring of the mixture takes place by mechanical advancement.

This apparatus, completed at the outlet end by a shaping die, delivers small 50 g chunks preformed in an "ovoid" shape.

The final shaping is carried out by instantaneous pressing in moulds.

The products thus obtained undergo rapid cooling in a low-temperature (2° C.) refrigeration chamber.

The products are subsequently demoulded cold by coating with the aid of a covering wax or edible wax.

The products thus prepared receive an outer packaging.
The products are brought together.

Example 2

Production of Mini-products Based on Soft Curd

The raw material (soft curd with a low dry-matter content, 40–50%) undergoes cold size reduction, in the form of cossettes (3×3×3 cm).

The cossettes thus prepared are introduced cold into a chamber for kneading and heat treatment under vacuum (cutter).

The structuring agent is added, which is composed of Na citrate (in a proportion of 0.22% by weight) and sorbic acid (in a proportion of 0.09% by weight), followed by water, in a proportion of 0.45% by weight.

The mixture thus prepared is then salted with 0.3% (weight/weight) of NaCl, and then undergoes:
mixing under partial vacuum (0.7 bar), for 1 minute, at a temperature of 10° C., with reduced mechanical stirring (100 rpm);
heat treatment under partial vacuum (0.7 bar) for 1 minute, with reduced mechanical stirring, to reach a temperature of 45° C.,
conditioning, under partial vacuum (0.7 bar), with reduced mechanical stirring, at this temperature for 10 seconds,
cooling with reduced mechanical stirring to a temperature of 40° C. under partial vacuum (0.7 bar) for 2 minutes.

The vacuum is interrupted.

The mass obtained is transferred to an endless-screw advance system which continues the texturing operation.

The textured mass thus processed is fed into a two-part moulder for shaping and packing into two-part shells of the 25 g products.

The products thus packed undergo rapid cooling in a dynamic refrigeration tunnel at a temperature of 4° C.

The products are subsequently brought together in a net bag of 5 units for selling.

Example 3

Production of Mimolette-based Cheese Mousse

The mimolette is reduced to a "meal" (grains 0.2 mm in diameter).

The raw material thus prepared is introduced cold into a chamber for kneading and vacuum treatment (kneader). The following are added: Na polyphosphate (in a proportion of 1.22% by weight) and sorbic acid (in a proportion of 1.4% by weight), followed by water in a proportion of 1.7% relative to the dry-matter content of the raw material.

The mixture obtained is then salted with 0.2% (weight/weight) of NaCl.

The mixture thus prepared undergoes:
mixing under partial vacuum (0.6 bar), lasting 1 minute, at a temperature of 15° C., with mechanical stirring,
heat treatment under partial vacuum (0.6 bar), by direct steam injection for 2 minutes with mechanical stirring, to reach a temperature of 55° C.;
conditioning, under partial vacuum (0.6 bar) with mechanical stirring, at the temperature which was reached, for 20 seconds;
cooling with reduced mechanical stirring, under partial vacuum (0.6 bar), to a temperature of 50° C., for 40 seconds.

The vacuum is interrupted.

The mass obtained is discharged and fed to a ®Mondomix expander.

The expanded mass is metered into 100 g boats which are heat-sealed under controlled atmosphere.

The products thus packed undergo rapid cooling in a low-temperature (4° C.) static refrigeration chamber.

Example 4

Production of Cheese Bar Containing Dry Fruit

The raw material, which is composed of brie, undergoes cold size reduction, in the form of cossettes (3×3×3 cm).

The raw material thus prepared is introduced cold into a chamber for kneading and heat treatment under partial vacuum.

Na polyphosphates (in a proportion of 0.26% by weight) and sorbic acid (in a proportion of 0.1% by weight), and water (in a proportion of 2.6% by weight), are added.

The mixture thus obtained is then salted with 0.2% (weight/weight) of NaCl.

The mixture subsequently undergoes:

mixing under partial vacuum (0.5 bar), lasting 30 seconds at a temperature of 5° C., with mechanical stirring;

heat treatment under partial vacuum (0.5 bar), by direct steam injection or in a jacket, depending on the desired texture, for 40 seconds, with mechanical stirring, to reach a temperature of 40° C.;

conditioning, under partial vacuum (0.5 bar), with mechanical stirring at this temperature for 20 seconds.

It is cooled under reduced mechanical stirring, to a temperature of 35° C., under partial vacuum (0.6 bar) for 2 minutes.

The vacuum is interrupted.

Feature elements comprising a mixture of grilled almonds and hazelnuts and dry apricots are then added to the mass thus treated.

The assembly obtained is mixed by slow controlled mechanical stirring (approximately 35 rpm) for 40 seconds to give a homogeneous mixture.

The mass is discharged and shaped into bars with a metering/extruding apparatus (weight 50 g).

The bars thus obtained undergo rapid cooling in a low-temperature (4° C.) dynamic refrigeration tunnel.

The products are packed individually in the cold state into "flow packs" under inert gas and are heat-sealed.

What is claimed is:

1. Process for manufacturing a cheese product, which comprises:

a) fractionating a starting cheese material having a protein network into pieces of cheese;

b) adding to the pieces of cheese an emulsifying and calcium-complexing agent and sorbic acid or salt thereof to obtain a mixture;

c) subjecting the mixture to heat treatment and mechanical treatment by kneading at a temperature of less than 60° C. for a period of between 30 seconds and 2 minutes in order to obtain a heated mixture with limited destructuring of the protein network of the starting cheese material;

d) cooling the heated mixture to a temperature of less than 50° C. in order to initiate restructuring of the protein network and constitution of a stable emulsion of fats and other constituents of the starting cheese material, and to obtain a curd;

e) subjecting the curd to a mechanical treatment in order to complete the restructuring of the protein network; and f) shaping the curd obtained in step e);

whereby the cheese product obtained has substantially the textural and organoleptic characteristics of said starting cheese material.

2. The process according to claim 1, wherein the ratio of the emulsifying and calcium-complexing agent to sorbic acid or its salts is between 3/1 and 9/1.

3. The process according to claim 1, wherein the amount of emulsifying agent is from 0.15 to 1.8% by weight relative to a total weight of the curd obtained in step d).

4. The process according to claim 1, wherein the amount of sorbic acid or its salts is from 0.05 to 0.2% by weight relative to the total weight of the curd obtained in step d).

5. The process according to claim 1, wherein the pieces of cheese are in the form of strands or meal.

6. The process according to claim 1, wherein the pieces of cheese have a volume no greater than 125 cm$^3$.

7. The process according to claim 1, wherein the starting cheese material has a dry matter content greater than 40% by weight.

8. The process according to claim 1, wherein the heat treatment is carried out at a temperature of between 30° C. and 60° C.

9. The process according to claim 1, wherein the heated mixture is cooled at a temperature of between 25° C. and 50° C. for a period of between 1 and 3 minutes.

10. The process according to claim 8, wherein steps c) and d) are carried out under a partial vacuum of between 0.4 and 0.7 bar.

11. The process according to claim 9, wherein steps c) and d) are carried out under a partial vacuum of between 0.4 and 0.7 bar.

12. The process according to claim 1, further comprising adding to the mixture consisting of the starting cheese material, the emulsifying and calcium-complexing agent, and the sorbic acid or a salt thereof, an amount of water not exceeding 30% by weight relative to the total weight of the mixture.

13. The process according to claim 12, wherein the amount of water added does not exceed 10% by weight relative to the total weight of the mixture.

14. The process according to claim 1, further comprising adding feature food elements to steps c) d) and e) in an amount of between 1 and 10% by weight.

15. The process according to claim 1, wherein the curd obtained at the end of step d) is expanded.

* * * * *